United States Patent Office 3,231,596
Patented Jan. 25, 1966

3,231,596
THIOCYANO-PHENYL-ISOTHIOCYANATES
Enrico Knüsli, Riehen, near Basel, and Anton G. Weiss, Basel, Switzerland, assignors to J. R. Geigy A.-G., Basel, Switzerland
No Drawing. Filed Mar. 18, 1963, Ser. No. 266,037
Claims priority, application Switzerland, Mar. 23, 1962, 3,481/62
10 Claims. (Cl. 260—454)

This invention relates to new derivatives of thiocyanophenyl-isothiocyanates and to the preparation thereof. The said new compounds are useful as active substances in pesticidal compositions.

It has surprisingly been found that thiocyano-phenyl-isothiocyanates of the general formula

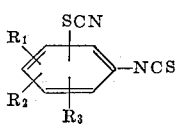

wherein $R_1$, $R_2$ and $R_3$ each, independently from one another, represents a hydrogen or halogen atom, the cyano group, a carboxyl-, carbamyl-, carbalkoxy- or acylamino radical or a possibly halogenated alkyl-, alkenyl- or alkinyl radical which is bound to the nucleus either direct or by way of an oxygen or sulphur atom, are particularly suitable on account of their highly specific action and their extremely wide effective range for controlling a large number of pests, such as insects, spiders, ticks, mites, nematodes, fungi and bacteria. Furthermore, these active substances are distinguished by their surprisingly low toxicity to warm blooded animals, and therefore they are particularly suitable for pest control on living organisms and on articles which might come into contact with human beings and animals.

Preferably, at least one of the symbols $R_1$, $R_2$ and $R_3$ is represented by hydrogen; if two of these groups are different from hydrogen, they are preferably identical. Among aliphatic hydrocarbon moieties in the definition of the radicals $R_1$, $R_2$ and $R_3$, those having from 1 to 4 carbon atoms are preferred, but compounds in which one of the radicals R comprises up to 12 carbon atoms, nevertheless show a good pesticidal activity.

Among halogen atoms in the definition of the radicals R, chlorine, bromine and fluorine may be mentioned. Preferred are those compounds bearing one or two halogen substituents on the nucleus. Among the halogenated and unhalogenated alkyl, alkenyl and alkinyl moieties in the definition of the radicals R, the methyl, trifluoromethyl, ethyl, isopropyl, butyl, allyl, metallyl, chloroallyl and propargyl radicals may be mentioned which are bound to the phenyl nucleus either direct or over an oxygen or sulphur atom.

New compounds are those active substances of the general Formula I, wherein at least one of the radicals $R_1$, $R_2$ and $R_3$ is different from hydrogen; only the unsubstituted 4-thiocyanophenyl-isothiocyanate has been known from the literature as an intermediate product, however without mention of any activity or use.

The new thiocyanophenyl-isothiocyanates bearing at least one other substituent on the phenyl nucleus, of the general Formula I are prepared by reacting a substituted aniline derivative of the general Formula II

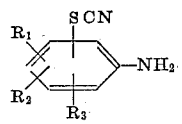

wherein $R_1$, $R_2$ and $R_3$ have the meanings given above, but at least one of these radicals not being hydrogen, with thiophosgene. This reaction is preferably carried out in the presence of a solvent, preferably water, an aliphatic ketone, such as acetone, an aromatic hydrocarbon, such as benzene, toluene etc. The reaction temperatures are between 0–150° C.

The new compounds, which are obtained in accordance with the method according to the invention, are substances which can be readily crystallised in some cases and are resistant to air and light. They can be kept in suitable organic solvents, such as for example hydrocarbons, ketones, ethers or dimethylformamide, without undergoing a decomposition.

Besides the three position isomers of the unsubstituted thiocyanophenyl-isocyanate, the following substituted derivatives, which may be obtained in accordance with the above mentioned methods, may be used as active substances in the aforesaid pesticidal compositions:

4-thiocyano-2-methyl-phenyl-isothiocyanate
4-thiocyano-3-methyl-phenyl-isothiocyanate
4-thiocyano-2-ethyl-phenyl-isothiocyanate
4-thiocyano-3-ethyl-phenyl-isothiocyanate
4-thiocyano-2-isopropyl-phenyl-isothiocyanate
4-thiocyano-2-tertiary butyl-phenyl-isothiocyanate
4-thiocyano-2,6-dimethyl-phenyl-isothiocyanate
4-thiocyano-2,5-dimethyl-phenyl-isothiocyanate
4-thiocyano-2,6-diethyl-phenyl-isothiocyanate
4-thiocyano-2,5-diethyl-phenyl-isothiocyanate
4-thiocyano-2,6 or 2,5-di-isopropyl-phenyl-isothiocyanate
3-thiocyano-2,4,6-trimethyl-phenyl-isothiocyanate
4-thiocyano-2,3,5-trimethyl-phenyl-isothiocyanate
4-thiocyano-2-allyl-phenyl-isothiocyanate
4-thiocyano-2-methoxy-phenyl-isothiocyanate
4-thiocyano-2-methylthio-phenyl-isothiocyanate
4-thiocyano-2-ethoxy-phenyl-isothiocyanate
4-thiocyano-2-ethylthio-phenyl-isothiocyanate
4-thiocyano-3-methoxy-phenyl-isothiocyanate
4-thiocyano-3-methylthio-phenyl-isothiocyanate
4-thiocyano-3-ethoxy-phenyl-isothiocyanate
4-thiocyano-2-allyloxy-phenyl-isothiocyanate
4-thiocyano-2-(2′-chlorallyloxy)-phenyl-isothiocyanate
4-thiocyano-2-(2′,3′-di-chlorallyloxy)-phenylisothiocyanate
4-thiocyano-2-(2′-chlorallylthio)-phenyl-isothiocyanate (cis and trans-compounds)
4-thiocyano-2(2′,2′-dichloroallylthio)-phenyl-isothiocyanate (cis and trans-compounds)
4-thiocyano-2-propargyl-oxy-phenyl-isothiocyanate
Thiocyano-isothiocyano-benzoic acid
Thiocyano-isothiocyano-benzoic acid methyl ester
Thiocyano-isothiocyano-benzamide Thiocyano-isothiocyano-benzonitrile
3- or 4-thiocyano-2-chloro-phenyl-isothiocyanate
4-thiocyano-3-chloro-phenyl-isothiocyanate
4-thiocyano-2,6-dibromo-phenyl-isothiocyanate
4-thiocyano-2,5-dichloro-phenyl-isothiocyanate
4-thiocyano-2-trifluoromethyl-phenyl-isothiocyanate
4-thiocyano-3-trifluoromethyl-phenyl-isothiocyanate
4-thiocyano-2-(2′,3′-cis-dichlorallyl)-phenyl-isothiocyanate
4-thiocyano-2-(2′,3′-trans-dichlorallyl)-phenyl-isothiocyanate
(or a mixture of the two last-mentioned cis and trans compounds)
4-thiocyano-2-(2′-chlorallyl)-phenyl-isothiocyanate The above listed compounds and other compounds of the general Formula I were tested for their action against insects, arachnids, nematodes, fungi and bacteria. It was found that these compounds have a particularly wide effective range.

The active substances of Formula I are particularly effective against the insects of the following orders: Orthoptera, especially cockroaches, locusts; Isoptera, especially termites; Heteroptera, especially bugs; Homoptera, especially cicadas, aphids, scales; Anoplura, especially body lice; Mallophaga, especially chewing lice; Coleoptera, especially bettles, beetle larvae, weevils; Lepidoptera, especially lepidopterous larvae; Hymenoptera, especially ants; Diptera, especially flies, midges especially mosquitoes and their larvae; Siphonoptera, especially fleas; Thysanoptera, especially thrips.

It has been found that these compounds have an excellent contact poison action in particular against the insects of the order Diptera, especially polyvalent-resistant and normally sensitive house flies, gentles, midges (mosquitoes) and the types of insects-orders listed above and also against arachnids. The action takes effect within a short period, in particular in the case of midges and flies. The persistence of the effect is good to very good.

The active substances according to the invention display the maximum effect in the form of residues, the adhesion of which to the substrate is slight. It has been found that the application of active substances in various forms of the preparation, for example as dusts, spray powders, emulsions or oil solutions shows substantially better results on the insects and arachnids mentioned than the application of the pure active substance.

If the pure active substances are applied as smoke, spray, mist etc., then the action for example on midges, especially mosquitoes takes effect within a very short period, whereas with the other insects a longer time elapses (up to approximately 1 hour) until the action takes effect.

The ovicidal effect of the compounds of the general Formula I was tested on the eggs of Mediterranean flour moths (Ephestia Kühniella), cotton stainers (Dysdercus fasciatus), polyvalent-resistant and normally sensitive house flies, mosquitoes and Colorado beetles. Freshly laid eggs were brought into contact with the active substance in the form of an emulsion. The active substances according to the invention have a good ovicidal effect even when highly diluted, that is to say up to approximately 0.01% calculated on the composition used.

The acaricidal effect of the compounds of the general Formula I was tested on mites, ticks and spiders. A good effect with tarsal contact was shown.

In combination with synergists, such as succinic acid-dibutylester, piperonyl butoxide, with p,p′-dichlor-diphenyl-trichloroethane (DDT), olive oil, paraffin hydrocarbons, groundnut oil, etc. the effective range is broadened and the effect in the compounds of general Formula I improved.

The fungicidal effect was tested on the following species of fungi: *Alternaria tenuis*, *Botrytis cinerea*, *Clasterosporium c.*, *Coniothyrium dipl.*, *Fusarium culm*, Mucor spec., Penicillium spec., *Botrytis fabae*, *Stemphylium cons.* It can be seen from the results that the active substances according to the present invention have a good to very good fungicidal effect.

As mentioned above, the active substances of the general Formula I may be used for controlling nematodes. The action is extended to normal soil nematodes with varying degrees of effect, as experiments on various types of nematodes, such as for example *Meloidogyne arenaria* have shown.

The following examples serve the purpose of explaining the method according to the invention more fully. Parts represent parts by weight and the temperatures are given in degrees centigrade.

EXAMPLE 1

107 parts of o-toluidine are reacted with 300 parts of sodium thiocyanate and 165 parts bromine in 160 parts by volume of glacial acetic acid in accordance with Kaufmann (DRP No. 484,360) to form 2-methyl-4-thiocyanoaniline. (Melting point: 66–67°.)

A suspension of 41 parts of 2-methyl-4-thiocyanoaniline in 150 parts of water is added with vigorous stirring at room temperature to a suspension of 29 parts of thiophosgene in 250 parts of water. The reaction mixture is stirred for 1 hour at room temperature. The precipitate deposited is drawn off by suction and dried in the vacuum exsiccator by way of sulphuric acid. The crude 2-methyl-4-thiocyano-phenyl-isothiocyanate obtained in this manner is dissolved in benzene. The pure 2-methyl-4-thiocyano-phenyl-isothiocyanate is precipitated with petroleum ether. The crystals are drawn off by suction, dried in air and have a melting point of 45.5 to 47°.

The 2,6-dimethyl-4-thiocyano-phenyl-isothiocyanate is obtained in the manner described above from 30 parts of 2,6-dimethyl-4-thiocyano-aniline (the preparation was effected in exactly the same manner as that of the 2-methyl-4-thiocyano-phenyl-isothiocyanate in Example 1) and from 20 parts of thiophosgene. The melting point of the crude product is 86–87°, recrystallised from benzene-petroleum ether: M.P. 87°.

EXAMPLE 2

A moderately heated suspension of 6.5 parts thiophosgene in 70 parts of water is added with vigorous stirring at room temperature to a suspension of 7 parts of 2-chloro-4-thiocyano-aniline (the preparation was effected in exactly the same manner as that of the 2-methyl-4-thiocyano-phenyl-isothiocyanate in Example 1) in 70 parts of water. The mixture is then stirred for 1 hour at room temperature and the crystals precipitated are drawn off by suction.

The crude 2-chloro-4-thiocyano-phenyl-isothiocyanate obtained is recrystallised from cyclohexane and has the melting point of 78–80°.

The 2-chloro-3-thiocyano-phenyl-isothiocyanate is obtained in exactly the same manner as described in Example 2 from thiophosgene and 2-chloro-3-thiocyano-aniline.

EXAMPLE 3

A suspension of 8.9 parts of 2,5-dimethyl-4-thiocyano-aniline (the preparation was effected in exactly the same manner as that of the 2-methyl-4-thiocyano-phenyl-isothiocyanate in Example 1) in 40 parts of water was added in portions to a suspension of 6 parts of thiophosgene in 50 parts of water whilst being vigorously stirred at room temperature. The reaction mixture is then stirred for a further hour at room temperature. The 2,5-dimethyl-4-thiocyano-phenyl-isothiocyanate precipitating in crystalline form is then drawn off by suction and dried in air. The white crude product has a melting point of 83–84°. The pure 2,5-dimethyl-4-thiocyano-phenyl-isothiocyanate, recrystallised from cyclohexane, has the melting point of 84–85°.

The 2,5-dimethyl-3-thiocyano-phenyl-isothiocyanate is obtained in exactly the same manner as in Example 3 from thiophosgene and 2,5-dimethyl-3-thiocyano-aniline.

EXAMPLE 4

A moderately heated suspension of 27.6 parts of 3-chloro-4-thiocyano-aniline (the production was effected in exactly the same manner as that of the 2-methyl-4-thiocyano-phenyl-isothiocyanate in Example 1) in 100 parts of water is added over a short period to a suspension of 20 parts thiophosgene in 150 parts of water with vigorous stirring. The reaction mixture is then stirred at room temperature for a further two hours. The precipitate is drawn off by suction and dried in air. The crude 3-chloro-4-thiocyano-phenyl-isothiocyanate has the melting point of 68–69°. After recrystallisation from ethanol, the 3-chloro-4-thiocyano-phenyl-isothiocyanate has a melting point of 68–70°.

The 3-chloro-5-thiocyano-phenyl-isothiocyanate is obtained from thiophosgene and 3-chloro-5-thiocyano-aniline in the manner described in Example 4.

EXAMPLE 5

A mixture of 41 parts of 3-methyl-4-thiocyano-aniline (the preparation was effected in exactly the same manner as that of the 2-methyl-4-thiocyano-phenyl-isothiocyanate in Example 1) is added over 10 minutes with vigorous stirring at 20–25° to a suspension of 30 parts of thiophosgene in 250 parts of water. After the addition had been completed, the reaction mixture is stirred for a further hour at room temperature. The precipitated crystals are drawn off by suction and dried in vacuo by way of sulphuric acid. The crude 3-methyl-4-thiocyano-phenyl-isothiocyanate has the melting point 39–41° (sintering point 37°). The crude product is dissolved in methyloxyethanol at 40° and purified with animal charcoal. The reaction product is precipitated with a little water from the clear solution. The crysals are drawn off by suction and dried in vacuo by way of sulphuric acid. The 3-methyl-4-thiocyano-phenyl-isothiocyanate obtained in this manner has the melting point of 41° (sintering point 40°).

EXAMPLE 6

12 parts of 2-propargyloxy-3-chloro-4-thiocyano-aniline are added to an aqueous suspension of 6 parts of thiophosgene in 50 parts of water within a few minutes at room temperature while continuously stirring. This mixture is then stirred for an hour at room temperature. After some time, the precipitate is sucked off, washed with ice water and dried over night in the exsiccator. The crude product is purified with animal charcoal and recrystallised from cyclohexane. The 2-propargyloxy-3-chloro-4-thiocyano-phenyl-isothiocyanate has a melting point of 107–109° C. Yield: 64% of the theory.

In the manner described in the above examples, the following compounds were prepared by reacting correspondingly substituted thiocyano-anilines with thiophosgene:

| | Melting point |
|---|---|
| 4 - thiocyanophenyl - isothiocyanate (known compound) | 65–67° |
| 3 - thiocyanophenyl - isothiocyanate, oil (not distillable) | |
| 2 - ethyl-4-thiocyano-phenyl-isothiocyanate, oil (not distillable) | |
| 3 - trifluoromethyl-4-thiocyano-phenyl-isothiocyanate | 36–37° |
| 2 - bromo-4-thiocyano-phenyl-isothiocyanate | 77–79° |
| 3 - bromo-4-thiocyano-phenyl-isothiocyanate | 93–95° |
| 2 - fluoro-4-thiocyano-phenyl-isothiocyanate | 57–59° |
| 3 - fluoro-4-thiocyano-phenyl-isothiocyanate | 60–62° |
| 5,6 - dichloro - 4-thiocyano-phenyl-isothiocyanate | 102–103° |
| 2,5 - dibromo - 4-thiocyano-phenyl-isothiocyanate | 105–106° |
| 2 - propargyloxy - 4-thiocyano-phenyl-isothiocyanate | 72–73° |
| 2 - allyloxy - 4 - thiocyano-phenyl-isothiocyanate | 52–54° |
| 2 - (2' - chloroallyloxy)-4-thiocyano-phenyl)-isothiocyanate | 73–74° |
| 5 - chloro - 2 - (2'-chloroallyloxy)-4-thiocyano - phenyl - isothiocyanate | 109–111° |
| 2 - allyl - 4 - thiocyano-phenyl-isothiocyanate, oil (not distillable) | |
| 2 - cyano - 4 - thiocyano-phenyl-isothiocyanate | 101–103° |
| 2 - carbomethoxy - 4 - thiocyano-phenyl-isothiocyanate | 98–99° |
| 2 - carboethoxy - 4 - thiocyano-phenyl-isothiocyanate | 77–80° |
| 3 - acetylamino - 4 - thiocyano-phenyl-isothiocyanate | 124–126° |
| 2 - acetylamino - 4 - thiocyano-phenyl-isothiocyanate | [1]158° |
| 2 - methoxy - 4 - thiocyano-phenyl-isothiocyanate | 86° |
| 3 - methoxy - 4 - thiocyano-phenyl-isothiocyanate | 135–136° |
| 2 - ethoxy - 4 - thiocyano-phenyl-isothiocyanate | 60° |
| 2 - butoxy - 4 - thiocyano-phenyl-isothiocyanate | 47° |
| 3 - butoxy - 4 - thiocyano-phenyl-isothiocyanate | 30–31° |
| 2 - dodecyloxy - 4 - thiocyano-phenyl-isothiocyanate | 50–52° |
| 2 - methylthio - 4 - thiocyano-phenyl-isothiocyanate | 94–96° |
| 2 - ethylthio - 4 - thiocyano-phenyl-isothiocyanate | 37° |
| 2 - butylthio - 4 - thiocyano-phenyl-isothiocyanate | 28° |
| 2 - dodecylthio - 4 - thiocyano-phenyl-isothiocyanate | 35° |
| 2 - carbamyl - 4 - thiocyano-phenyl-isothiocyanate | |
| 2 - (N - diethylcarbamyl)-4-thiocyano-phenyl-isothiocyanate | |

[1] Decomposition.

Generally spoken, the following types of compounds may be prepared according to the procedures of the above examples:

Alkoxy-thiocyano-phenyl-isothiocyanates,
Alkylthio-thiocyano-phenyl-isothiocyanates,
Cyano-thiocyano-phenyl-isothiocyanates,
Thiocyano-isothiocyano-benzoic acid esters and amides,
Halogenoalkyl-thiocyano-phenyl-isothiocyanates,
Alkenyloxy- and alkenylthio-thiocyano-phenyl-isothiocyanates and compounds of this type which are halogenated in the alkenyl group as well as
Alkinyloxy- and alkinylthio-thiocyano-phenyl-isothiocyanates.

As stated above, the compounds according to the present invention possess an extremely wide effective range and may be used in the most varied fields of application for controlling pests.

Below are given the results of some tests to which the active ingredients to be used according to this invention have been subjected:

In order to determine the *insecticidal contact poison action*, the active substances were dissolved in acetone, the solution was put into Petri dishes and the solvent evaporated off. After 1 hour the test insects mentioned in the table were placed in the Petri dishes containing the active substances but no more solvent. The amount of active substance in each Petri dish was 10 mg., 1 mg. and 0.1 mg. respectively; the temperature was 22° C.

The figures given in the table are time values (minutes=(') or hours=h), after which all insects (100% of the insects) in the dishes are completely immobilized.

| Active substance | Test insects ||||||||
|---|---|---|---|---|---|---|---|---|
| | House flies (*Musca domestica*) polyvalent resistant ||| Yellow fever mosquitoes (*Aedes aegyptii*) ||| Bean beetles (*Bruchidius obtectus*) |||
| | 10 mg. | 1 mg. | 0.1 mg. | 10 mg. | 1 mg. | 0.1 mg. | 10 mg. | 1 mg. | 0.1 mg. |
| 4-thiocyano-phenyl-isothio-cyanate | | | | | 2' | | | | |
| 3-methyl-4-thiocyano-phenyl-isothiocyanate | 36' | 5h | 24h | | 4' | | | 50' | |
| 2-ethyl-4-thiocyano-phenyl-isothiocyanate | | | | | 4' | | | | |
| 3-trifluoromethyl-4-thiocyano-phenyl-isothiocyanate | 66' | 71' | 24h | | 2' | | | 30' | |

In order to determine the *ovicidal activity*, 24 hours old eggs of Mediterranean flour moths (Ephestia Kühniella) were put into an aqueous 0.4% emulsion (prepared from a 25% emulsion concentrate) for 3 minutes, then placed in Petri dishes and kept for 8 days at 24° C. The concentration was 1 g. active substance in 1 liter of water (0.1%). After 8 days the number (in percent) of larvae hatched from the eggs was evaluated and is given in the table.

| Active substance | Hatching rate in percent (percentage of hatched larvae) ||
|---|---|---|
| | Treated | Untreated |
| 2,5-dimethyl-4-thiocyano-phenyl-isothiocyanate | 0 | 100 |
| 4-thiocyano-phenyl-isothiocyanate | 0 | 100 |

In order to determine the *acaricidal activity*, bean leaves infested with red spiders (*Tetranychus urticae*) are sprayed on both sides with an aqueous emulsion containing 0.1% and 0.05%, respectively, of active substance. After three days, the percentage of dead spiders is evaluated; the temperature during the test was 20–22° C.

| Active substance concentration | Percent of dead spiders ||||
|---|---|---|---|---|
| | Adults || Imagines ||
| | 0.1 | 0.05 | 0.1 | 0.05 |
| 2-methyl-4-thiocyano-phenyl-isothiocyanate | | 100 | | 85 |
| 2-allyl-4-thiocyano-phenyl-isothiocyanate | 100 | | 100 | |

Organic solvents, such as aliphatic and alicyclic ketones, hydrocarbons such as benzene, xylenes, toluene, petrols, furthermore chlorinated and fluorinated hydrocarbons such as chlorobenzene are particularly suitable for the preparation of solutions. It is frequently necessary to produce a so-called carrier solution from the active substance and the above mentioned solvents and to dissolve this in high-boiling solvents, such as, for example, petroleum fractions like kerosenes, methylnaphthalenes, xylenes, petrols, etc.

Solutions of active substance in aromatic hydrocarbons, such as for example xylenes, toluene and halogenated hydrocarbons such as chlorobenzene and the like, are particularly suitable for the direct spraying of objects and for the impregnation of materials such as for example textiles.

As well as in the form of solutions, the active substances according to the invention may also be applied in aqueous preparations, such as for example dispersions (emulsions and suspensions). For the preparation of an emulsion, the substances are homogenised in water in one of the above mentioned solvents, preferably in the presence of a dispersing agent. Cationic, anionic and non-ionic preparations may be mentioned as dispersing agents or emulsifiers. Cationic preparations, which may be used are for example quaternary ammonium compounds and morpholine derivatives. Anionic dispersing agents or emulsifiers are soaps, alkali and earth alkaline salts of long-chain aliphatic sulphuric acid monoesters, containing from 10 to 18 carbon atoms, of aliphatic-aromatic sulphonic acids or of long-chain alkoxy acetic acids. Non-ionic dispersing agents or emulsifiers, which may be used for preparing the active substances according to the invention, are for example polyethylene glycol ethers of fatty alcohols or alkyl phenols, polycondensation products of ethylene oxide and propylene oxide, water-soluble cellulose derivatives, alkylalkanolamides and sugar derivatives of higher fatty acids. Film-forming and adhesion agents may furthermore be added to the emulsions or dispersions, such as for example mineral and vegetable oils, polyvinylalcohols, polyvinylpyrrolidones, hydroxyalkylcellulose etc. Furthermore, plastiform or liquid concentrates, which can be diluted with water to any desired concentration, may be produced from the active substances according to the invention of the above mentioned emulsifiers, dispersing agents (possibly by means of solvent additions), thickening agents, protective colloids and other ointment bases.

For dusts and scattering agents, the active substances are added in various ways to finely ground or granulated carriers, which may be inert, acid or alkaline. The carriers may thus be impregnated with the solutions of the active substances as described above, furthermore the solid active substances may be ground with the carriers or the carriers may be impregnated with the melted active substances. Inorganic substances, such as silicates, for example kaolins, montmorillonites, bentonites, zeolites, kieselguhr, diatomaceous earth, glass powder, loess, furthermore talc, magnesia usta, boric acid, tricalcium phosphate, in some cases calcium carbonate, for example in the form of prepared chalk, quick lime and finely ground lime, may be regarded as carriers for these forms of preparation. Furthermore, organic substances such as wood meal, cork dust, walnut shell powder or granules etc., may serve as carriers. It is furthermore advisable to use mixtures of the above mentioned inorganic and/or organic carriers.

By adding surface-active substances, such as wetting agents, for example sulphite waste liquor, and dispersing agents, for example the above mentioned dispersing agents, the preparations in powder form may be rendered suspensible in water and in this form may be used as spray powders. In many cases it is recommended to add adhesives, such as for example polyvinylalcohols, polyvinylpyrrolidone, alkaline earth salts and alkali salts of long-chain aliphatic fatty acids, mineral or vegetable oils and in particular protective colloids and/or thickening agents such as glue, alginates, casein.

To promote contact with the pests, the active substances can be used together with lures and baits, mixed with sugar for example or applied on sugar and similar materials. The biological effect may likewise be extended by adding substances containing bactericidal, fungicidal, nematocidal or insecticidal properties.

The following examples describe the preparation of the various forms of processing.

EXAMPLE 7

Spray (a) 2 parts of 3-chloro-4-thiocyano-phenyl-isothiocyanate are dissolved in 10 parts of xylene and 88 parts of petroleum.

(b) 2 parts of 4-thiocyano-phenyl-isothiocyanate and 3 parts of 1,1-bis-(p-chloro-phenyl)-2,2,2-trichloroethane are dissolved in 10 parts of xylene or another auxiliary solvent and 85 parts petroleum.

Both solutions are especially suitable for example for controlling flies and midges in dwellings and in warehouses and slaughterhouses.

EXAMPLE 8

Fumigants (a) 20 parts of an active substance are mixed with 61 parts of wood meal, which was previously impregnated with 18.4 parts of sodium nitrate, and the mix was pressed into tablets.

(b) 50 parts of active substance, 22 parts of sugar, 12 parts of potassium chlorate, 2.4 parts of potassium nitrate and 13.6 parts of wool meal are ground and intimately mixed. The fumigant mix is put in cans and ignited with a wick or a fuse.

Smoke papers

Ordinary filter paper is treated with a 5% potassium nitrate solution. The active substance is applied to this filter paper in the form of a 25% acetonic solution. The smoke paper obtained in this manner contains approximately 30% of active substance. The insecticidal smoke, arising from the tablets and from the fumigant mix, is particularly suitable for controlling insects in closed spaces.

Fumigation

The active substance is evaporated either alone or with suitable additives, which promote evaporation by means of moderate heating for example on an electrically heated plate, and in this manner destroys insects in a closed space.

EXAMPLE 9

Emulsion

An emulsion is prepared from 10 parts of 3-methyl-4-thiocyano-phenyl-isothiocyanate or 2-allyl-4-thiocyano-phenyl-isothiocyanate, 20 parts of xylene, 20 parts of alkylarylpolyethoxyethanol, 20 parts acetic acid ethyl ester and 30 parts acetone, which can be diluted with water to any desired concentration. Such emulsions are also suitable for preparing a residual spray.

Natural and synthetic resins, dextrin, starch, water glass, adhesives etc. may also be used as additions to emulsions.

EXAMPLE 10

Dust 1 part of 2,6-dimethyl-4-thiocyano-phenyl-isothiocyanate is ground as finely as possible with 99 parts of talc. The adhesion of this powder may be increased by adding 2 parts of a liquid fatty acid. This dust may be employed for controlling pests, in particular in households and in storage protection.

EXAMPLE 11

Scattering agent 1 part of 2-ethyl-4-thiocyano-phenyl-isothiocyanate is mixed with 99 parts of a silicate. This scattering agent is suitable for all those places where a finely powdered material cannot be used on account of the formation of dust.

EXAMPLE 12

Spray powder (wettable powder)

(a) 50 parts of 3-trifluoromethyl-4-thiocyano-phenyl-isothiocyanate are intimately ground with 50 parts of a silicate, such as for example a zeolite or a celite. A concentrate is obtained, which may be processed to a spray powder. A 25% spray powder, with which stable suspensions forming only a slight and unstable foam may be produced, is obtained from 50 parts of this concentrate, 38.5 parts kaolin, 2 parts of a dispersing agent, such as for example polyvinylpyrrolidone, 5 parts of a wetting agent, for example alkylpolyethoxyethanol (with 80 ethylene oxide), 2.5 parts of a propylene oxide ethylene oxide condensation product and 2 parts of paraffin oil. The wettability of this powder is very good.

(b) 50 parts of a concentrate consisting of equal parts of 2-methyl-4-thiocyano-phenyl-isothiocyanate and of a silicate, 42 parts of kaolin, 1 part of an adhesive such as for example polyvinylpyrrolidone, 5 parts of a dispersing agent, for example a condensation product of naphthalene sulpho acids and formaldehyde and 2 parts of an anionic wetting agent, for example of a salt of the sulphated hexadecylglycolether, are mixed in a trolley mixer until the formulation is homogeneous. The mixture is then ground in a pinned disc mill and subsequently re-mixed in a trolley mixer. The wettability of the powder is very good.

(c) A concentrate is obtained from 50 parts of 4-thiocyano-phenyl-isothiocyanate and 50 parts of a zeolite. 50 parts of this concentrate are mixed, until homogeneity is reached and ground together with 40.5 parts kaolin, 5 parts of an anionic wetting agent, for example of the sodium salt of sulphated hexadecylglycol ether, 2.5 parts of a dispersing agent, for example the condensation product of naphthalene sulphonic acids with formaldehyde and 2 parts of an adhesive for example magnesium stearate. A spray powder is obtained which can be processed with water to form stable suspensions.

What is claimed is:

1. A compound of the formula

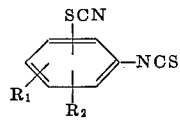

wherein
$R_1$ is a member selected from the group consisting of halo, cyano, carboxy, carbamyl, alkoxycarbonyl wherein the alkoxy moiety has from 1 to 4 carbon atoms, alkyl carbamyl wherein the alkyl moiety has from 1 to 4 carbon atoms, acetylamino, alkyl of from 1 to 4 carbon atoms, halo alkyl of from 1 to 4 carbon atoms, alkenyl of from 1 to 4 carbon atoms, halo alkenyl of from 1 to 4 carbon atoms, alkoxy of from 1 to 12 carbon atoms, alkenyloxy of from 1 to 4 carbon atoms, halo alkenyloxy of from 1 to 4 carbon atoms, halo alkylthio of from 1 to 4 carbon atoms, alkylthio of from 1 to 12 carbon atoms, alkinyl of from 1 to 4 carbon atoms, and alkinyloxy of from 1 to 4 carbon atoms, wherein halo is a member selected from the group consisting of fluoro, chloro, and bromo; and $R_2$ is a member selected from the group consisting of hydrogen, chloro, bromo and alkyl of from 1 to 4 carbon atoms.

2. The compound 3-methyl-4-thiocyano-phenyl-isothiocyanate.

3. The compound 2-methyl-4-thiocyano-phenyl-isothiocyanate.

4. The compound 2,5-dimethyl-4-thiocyano-phenyl-isothiocyanate.

5. The compound 2,6-dimethyl-4-thiocyano-phenyl-isothiocyanate.

6. The compound 2-chloro-4-thiocyano-phenyl-isothiocyanate.

7. The compound 3-chloro-4-thiocyano-phenyl-isothiocyanate.

8. The compound 2-bromo-4-thiocyano-phenyl-isothiocyanate.

9. The compound 2-ethyl-4-thiocyano-phenyl-isothiocyanate.

10. The compound 3-trifluoromethyl-4-thiocyano-phenyl-isothiocyanate.

References Cited by the Examiner

UNITED STATES PATENTS

| 2,313,945 | 3/1943 | Kellog et al. | 260—454 |
| 2,680,759 | 6/1954 | Otto | 260—454 |
| 2,872,367 | 2/1959 | Haynes et al. | 167—30 |
| 2,943,016 | 6/1960 | Rosen et al. | 167—30 |

CHARLES B. PARKER, *Primary Examiner.*

JULIAN S. LEVITT, *Examiner.*